US012333057B2

(12) United States Patent
Hulton et al.

(10) Patent No.: US 12,333,057 B2
(45) Date of Patent: Jun. 17, 2025

(54) SECURITY MANAGERS AND METHODS FOR IMPLEMENTING SECURITY PROTOCOLS IN A RECONFIGURABLE FABRIC

(71) Applicant: MICRON TECHNOLOGY, INC., Boise, ID (US)

(72) Inventors: David Hulton, Seattle, WA (US); Jeremy Chritz, Seattle, WA (US)

( * ) Notice: Subject to any disclaimer, the term of this patent is extended or adjusted under 35 U.S.C. 154(b) by 0 days.

(21) Appl. No.: 17/511,301

(22) Filed: Oct. 26, 2021

(65) Prior Publication Data

US 2022/0050931 A1 Feb. 17, 2022

Related U.S. Application Data

(63) Continuation of application No. 16/154,705, filed on Oct. 8, 2018, now Pat. No. 11,176,281.

(51) Int. Cl.
*G06F 21/00* (2013.01)
*G06F 15/78* (2006.01)
*G06F 21/60* (2013.01)
*G06F 21/76* (2013.01)

(52) U.S. Cl.
CPC .......... *G06F 21/76* (2013.01); *G06F 15/7882* (2013.01); *G06F 21/602* (2013.01)

(58) Field of Classification Search
CPC ..... G06F 21/602; G06F 15/7882; G06F 21/76
USPC .......................................................... 713/189
See application file for complete search history.

(56) References Cited

U.S. PATENT DOCUMENTS

| | | | |
|---|---|---|---|
| 7,100,020 B1 | 8/2006 | Brightman et al. | |
| 7,644,137 B2 * | 1/2010 | Bozak ................... | G06F 9/5083 710/36 |
| 7,761,680 B2 * | 7/2010 | Ash ..................... | G06F 11/2033 711/120 |
| 8,010,801 B2 | 8/2011 | Qi et al. | |
| 11,176,281 B2 | 11/2021 | Hulton et al. | |
| 11,436,344 B1 * | 9/2022 | Juch ...................... | G06F 16/215 |
| 2003/0041163 A1 | 2/2003 | Rhoades et al. | |
| 2004/0165588 A1 | 8/2004 | Pandya | |
| 2006/0106803 A1 * | 5/2006 | Takeuchi .............. | G06F 21/606 707/999.009 |
| 2006/0292292 A1 | 12/2006 | Brightman et al. | |
| 2007/0220232 A1 | 9/2007 | Rhoades et al. | |
| 2011/0083000 A1 | 4/2011 | Rhoades et al. | |

(Continued)

OTHER PUBLICATIONS

U.S. Appl. No. 16/154,705 titled "Security Managers and Methods for Implementing Security Protocols in a Reconfigurable Fabric", filed Oct. 8, 2018., pp. all.

*Primary Examiner* — Josnel Jeudy
(74) *Attorney, Agent, or Firm* — Dorsey & Whitney LLP

(57) ABSTRACT

An apparatus, and a method therefore, are described, the apparatus according to one embodiment including a security manager and a plurality of clusters of processing elements. Each cluster of the plurality of clusters includes a respective plurality of processing elements. A controller of the apparatus, which may include a security manager, may be configured to control the plurality of clusters to receive a first data stream and a second data stream, control a first plurality of processing elements in a first cluster to process the first data stream using a first security protocol, and control a second plurality of processing elements in a second cluster to process the second data stream using a second security protocol.

19 Claims, 7 Drawing Sheets

(56) References Cited

U.S. PATENT DOCUMENTS

| | | | |
|---|---|---|---|
| 2012/0102189 A1* | 4/2012 | Burge | G06F 9/5083 |
| | | | 709/224 |
| 2015/0379278 A1 | 12/2015 | Thota et al. | |
| 2016/0085721 A1 | 3/2016 | Abali et al. | |
| 2020/0073769 A1* | 3/2020 | Killadi | G06F 11/1438 |
| 2020/0110581 A1* | 4/2020 | Ould-Ahmed-Vall | |
| | | | G06F 9/3893 |
| 2020/0110908 A1 | 4/2020 | Hulton et al. | |
| 2022/0343210 A1* | 10/2022 | Lee | G06Q 50/04 |
| 2024/0069767 A1* | 2/2024 | Paithankar | G06F 3/067 |

\* cited by examiner

SECURITY MANAGERS AND METHODS FOR IMPLEMENTING SECURITY PROTOCOLS IN A RECONFIGURABLE FABRIC

CROSS REFERENCE TO RELATED APPLICATION(S)

This application is a continuation of U.S. patent application Ser. No. 16/154,705, filed Oct. 8, 2018 and issued as U.S. Pat. No. 11,176,281 on Nov. 16, 2021. The aforementioned application is incorporated herein by reference in its entirety for any purpose.

TECHNICAL FIELD

Examples described herein relate to computer systems. Examples of a host-less computer system having a security manager for controlling access to a reconfigurable fabric are described.

BACKGROUND

Digital signal processing for wireless communications, such as digital baseband processing or digital front-end implementations, may be implemented using some hardware (e.g., silicon) computing platforms. For example, multimedia processing and digital radio frequency (RF) processing may be accomplished in a digital front-end implementation of a wireless transceiver, as implemented by an application-specific integrated circuit (ASIC). A variety of hardware platforms may implement such digital signal processing, such as the ASIC, a digital signal processor (DSP) implemented as part of a field-programmable gate array (FPGA), or a system-on-chip (SoC). However, each of these solutions often requires implementing customized signal processing methods that are hardware implementation specific. For example, a digital signal processor may implement a specific portion of digital processing at a cellular base station, such as filtering interference based on the environmental parameters at that base station. Each portion of the overall signal processing performed may be implemented by different, specially-designed hardware, creating complexity.

Moreover, there is interest in moving wireless communications to "fifth generation" (5G) systems. 5G offers promise of increased speed and ubiquity, but methodologies for processing 5G wireless communications have not yet been set. In some implementations of 5G wireless communications, "Internet of Things" (IoT) devices may operate on a narrowband wireless communication standard, which may be referred to as Narrow Band IoT (NB-IoT). For example, Release 13 of the Third Generation Partnership Project (3GPP) specification describes a narrowband wireless communication standard.

Many traditional computer systems have different security protocols and algorithms used to set security protocols for a storage memory to processing tasks. Computer systems may include FPGA boards that use a control block to interact with an advanced extensible interface (AXI) interface. The control block may interact with the AXI interface to receive data from memory via a peripheral component interconnect/express (PCI/e) interface.

DETAILED DESCRIPTION OF PREFERRED EMBODIMENTS

Figure 1:
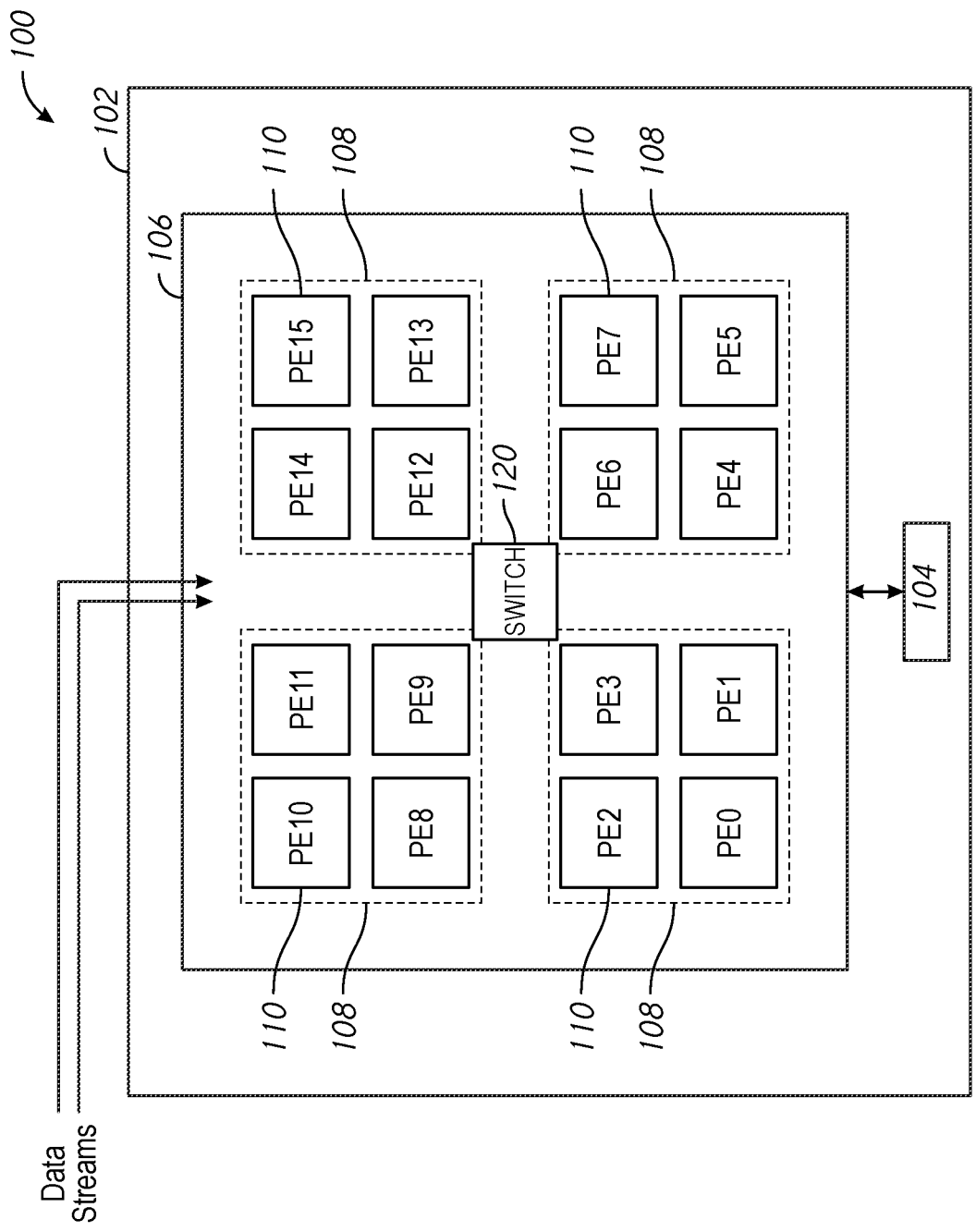
FIG. 1 is a block diagram showing a computer system, according to examples described herein.

Certain details are set forth below to provide a sufficient understanding of embodiments of the invention. However, it will be clear to one skilled in the art that embodiments of the invention may be practiced without various of these particular details. In some instances, well-known wireless communication components, circuits, control signals, timing protocols, computing system components, and software operations have not been shown in detail in order to avoid unnecessarily obscuring the described embodiments of the invention. With improvements in programming capabilities and the continually increasing demand for persistent and low-power memory devices, there is a need for a computer system with the ability to determine and apply different security protocols (e.g., encryption techniques) for handling different types of data.

Examples described herein include, for example, a computing system having a number of processing elements (e.g., which may form a reconfigurable fabric) having a plurality of clusters. Each of the plurality of clusters may include a plurality of processing elements. The plurality of clusters of the reconfigurable fabric may receive data streams including data having different types. A memory to processor interface may be used to process the data as and/or after it is received and may provide the data to the plurality of clusters in the reconfigurable fabric. The data may be received by the reconfigurable fabric by using any of various types of data transmission/reception methods. The computer system may include a security manager. The security manager may mange the implementation of security protocols in the reconfigurable fabric, such as by configuring certain numbers of the clusters and/or processing elements to implement certain security protocols. The security manager may determine which clusters and/or which processing elements may process (e.g., encrypt) particular data. For example, data which is intended to be processed using a particular security protocol may be provided to processing elements and/or clusters configured to implement that protocol.

In some examples the security manager may dynamically reconfigure processing elements of the reconfigurable fabric to implement various security protocols. In this manner, the number of processing elements configured to implement particular security protocols may vary over time, and may vary in accordance with the volume of data provided to be processed using that protocol and/or the amount of time expected to process data in accordance with a particular security protocol. For example, the security manager may determine how long an individual cluster or group of clusters would take to process (e.g., encrypt) data of a certain type, using a particular security protocol, as the data is received. Based on different characteristics of the processing elements, the cluster, and the security protocol, the processing elements of the cluster may have the capability to process the data at a slower or a faster speed. The data to be processed by any of the processing elements may be controlled by the security manager to be accessed by only the processing elements processing that type of data, and not by other processing elements in the cluster or in other clusters. The security protection capabilities of the security manager may achieve variations in cluster level security throughout the reconfigurable fabric.

Accordingly, examples of apparatuses described herein may include a reconfigurable fabric. Generally, a reconfigurable fabric may include a plurality of clusters of processing elements. Any number of clusters may be present including one, two, three, four five, ten, twenty, fifty, or another number of clusters. A cluster may include any number of processing elements including one, two, three, four, five, ten, twenty, fifty, or another number of processing elements. Generally, the cluster refers to a group of processing elements which may be configured to implement a particular security protocol.

Processing elements may refer to elements intended to execute one or more instructions, which may be loaded into memory accessible to and/or otherwise associated with the executing element.

Security protocols described herein may include encryption techniques. In some examples, a security protocol may refer to a communication technique or other data manipulation intended to provide data and/or communication security. Each of the clusters may have different security protocols for processing the data. For example, clusters may implement lowest common denominator algorithms, higher encryption algorithms, standard SSL security algorithms, and/or RS2 algorithms. The security protocol used to process the data may be automatically set by the security manager, and/or may be customized according to the type of data received to be encrypted by the processing elements of any of the clusters. In some examples, users may specify the type of security protocol used by the processing elements of any of the clusters to process the data. The security manager may override the user setting in some examples to process the data by a different security protocol than the security protocol requested by the user, such as a higher level security protocol or a lower level security protocol.

Security managers described herein may be implemented using one or more processing elements, such as one or more processors, controllers, etc. Security managers described herein may control a security protocol implemented by clusters of processing elements. For example, security managers may determine a number of processing elements to be used in each of multiple clusters of processing elements and a security protocol to be implemented by each cluster. The cluster may be configured to implement a particular security protocol by loading instruction set(s) into processing elements of the cluster (e.g., by loading instruction set(s) into memory accessible to and/or associated with one or more executing element). The instruction set(s), when executed by the executing elements, may implement the particular security protocol (e.g., encryption technique).

The number of processing elements may be set and/or dynamically adjusted by security managers described herein. For example, if a greater demand occurs for a particular security protocol (e.g., if more data arrives to be processed by one security protocol than another), more processing elements may be allocated toward performance of the popular security protocol by the security manager. The reconfigurable nature of the fabric allows for different instruction sets to be loaded for processing units—reconfiguring them from implementing one security protocol to implementing another. As another example, security managers may monitor an amount of time taken to process data using particular security protocols. If the amount of time used to process data in accordance with a particular security protocol increases beyond a threshold amount (e.g., if a processing time for encrypting a data stream exceeds a threshold time), security managers described herein may increase a number of processing elements used to implement that security protocol, which may reduce the amount of time used to process data in accordance with that security protocol.

During operation, security managers described herein may examine incoming data stream(s) and provide incoming data to a particular cluster of processing elements based on the type of data. The type of data may be used to indicate what security protocol should be used to process the data. The type of data may be ascertained by the security manager by examining all or a portion of the data—e.g., using a header, indicator, flag, or other portion of the data.

Generally, a hardware platform that may change the provision of control instructions to certain processing elements, for example, while executing instructions on certain other processing elements may be referred to as reconfigurable. A reconfigurable hardware platform, such as a reconfigurable fabric (e.g., an integrated circuit having the functionality of a reconfigurable hardware platform), may change and/or update instructions sent to certain processing units. Some processing units on the reconfigurable hardware platform may be executing or performing a certain functionality, such as adding or accumulating, and the processing units may be reconfigured to receive different instructions that may alter or change their respective functionalities. Such advantages related to rate of instruction execution or efficiency of instruction set execution may offer may lead to faster processing time of reconfigurable hardware platforms over a conventional ASIC or a specially-configured DSP unit.

Examples of data which may be processed by reconfigurable fabrics described herein include wireless communication data. A reconfigurable hardware platform may mix coefficient data with input data (e.g., input data from a sensor or output data from another processing stage) to implement one or more wireless processing stages to generate output data for that processing stage. The coefficient data may be any data that is specific to a processing stage. A processing stage may be associated with specific signal processing techniques such that the coefficient data corresponds to a non-linear mapping of the input data being processed according to those specific signal processing techniques. The output data may be an approximation of the input data being processed in hardware (e.g., an FPGA) specifically-designed to implement the processing stage to which the coefficients correspond. Depending on whether the output data is to be processed in an additional processing stage, some output data may be referred to as intermediate output data. In an example, an FPGA may be designed to implement various signal processing techniques, including scrambling, error-correction coding, inner coding, interleaving, frame adaptation, modulation, multi-user access coding, inverse Fourier transforms, or guard interval addition. Coefficients associated with the baseband processing stage may be utilized such that the output data is an approximation of input data being processed according to such an FPGA.

Advantageously in some examples, the systems and methods described herein may operate according to multiple standards and/or with multiple applications, including changes or upgrades to each thereto; in contrast to the inflexible framework of an ASIC-based solution. In some examples, as discussed herein in terms of processing units implementing multiplication, addition, or accumulation functionalities, examples of the systems and methods described herein may operate on a power-efficient framework, consuming minimal power with such functionalities; in contrast to a power-hungry framework of a FPGA/DSP-based solution. In some examples, systems and methods described herein may operate with a substantially integrated framework from a unified programming language perspective; in contrast to the various programming languages needed for integration of an SoC solution that may pose programming challenges when implementing heterogeneous interfaces for control units, computational units, data units and accelerator units.

FIG. 1 is a is a block diagram showing a computer system, according to an example described herein. For example, a computer system 100 may include an FPGA 102, the FPGA 102 including and a security manager 104 and a reconfigurable fabric 106. The reconfigurable fabric 106 may further include a plurality of clusters 108 partitioned separately from one other, each of the clusters 108 having processing elements 110. The reconfigurable fabric 106 may further include a switch 120.

The FPGA 102 may receive one or more data streams. The data streams may be received serially or in parallel. The security manager 104 may be used to manage the plurality of clusters 108 so that all the data streams may be accessed, rearranged and managed on a single device, without the use of additional memory devices or a separate data management unit. Multiple users or clients may reconfigure the same reconfigurable fabric 106 including the plurality of clusters 108. The security manager 104 may be, for example, internal hardware control logic, a software manager, or a processor that is separate from the FPGA 102.

The plurality of clusters 108 may be controlled by the security manager 104 or by a separate file management system, software, or through commands and instructions from a processor or memory controller in the FPGA 102. The security manager 104 may determine to process certain data automatically based on the type of the plurality of data streams, or based on other characteristics of any of the plurality of clusters 108 in any of the plurality of clusters 108. The security manager 104 may determine that certain clusters of the plurality of clusters 108 of the reconfigurable fabric 106 have different security protocols. For example, a first cluster of the reconfigurable fabric 106 may have a security protocol focused on quality of service, while a second cluster of the reconfigurable fabric 106 may have a security protocol focused on a specific encryption technique (e.g., turbocoding).

The security manager may update a security protocol used in at least one cluster of the plurality of clusters 108 with new security settings for that protocol. In some examples, certain cluster(s) of the plurality of clusters 108 may be updated, but not other cluster(s) of the plurality of clusters 108 of the reconfigurable fabric 106. Protocols corresponding to less than all clusters of the plurality of clusters 108 may be updated by the security manager. By updating the one cluster of the plurality of clusters 108, but not the another cluster of the plurality of clusters 108 of the reconfigurable fabric 106, a segmented approach to updating security protocols is achieved. The security manager may allow a user to select, or may automatically select, one or both of updating protocols corresponding to less than all clusters of the plurality of clusters 108, and updating protocols corresponding to all clusters of the plurality of clusters 108.

The security manager 104 may provide a flow of security updates while data is being processed on one or more of the plurality of clusters 108 of the reconfigurable fabric 106. The security manager 104 may determine that one or more of the plurality of processing elements 110 in one or more of the plurality of clusters 108 may not be needed for processing a task during a certain time. Alternatively, the security manager 104 may determine that one or more clusters of the plurality of clusters 108 may not be needed for processing a task during a certain time. Some clusters of the plurality of processing elements 110 determined to not be needed by the reconfigurable fabric 106 for processing a task during a certain time, may be updated by reconfigurable fabric 106 to implement a different security protocol during the certain time. Alternatively, some clusters of the plurality of clusters 108 determined to not be needed by the reconfigurable fabric 106 for processing a task during a certain time, may be updated by reconfigurable fabric 106 to have new security protocol(s) during the certain time.

The plurality of processing elements 110 of the plurality of clusters 108 may process (e.g., encrypt) the received data streams used for a process or for a plurality of processes (e.g., data provided via the received data streams may be processed and/or encrypted by the plurality of clusters 108). The plurality of clusters 108 may include a first cluster of the reconfigurable fabric 106 configured to process (e.g., encrypt data) for a security protocol focused on quality of service, and a second cluster of the reconfigurable fabric configured to perform a specific encryption technique (e.g., turbocoding) by using a security protocol focused on the specific encryption technique. One or more of the plurality of processing elements 110 in one cluster of the plurality of clusters 108 may be configured to process data of a first type, and a another one or more of the plurality of processing elements 110 in the one cluster of the plurality of clusters 108 may be configured to process data of a second type (e.g., the one cluster configure to process the data of the first type may also process the data of the second type, if the data of the second type is to use substantially equivalent, or less thorough, encryption than the data of the first type). The security manager 104 may track changes to the other partitioned regions of the FPGA 102. The security manager 104 may be periodically updated to adjust the partitioning assignments of the FPGA 102.

The security manager 104 may indicate which data streams providing the data to the plurality of clusters 108 are to be processed by specific clusters of the reconfigurable fabric. The security manager 104 may maintain access to the reconfigurable fabric 106 from any outside entity, parsing data to be processed on the clusters based on the level of security requested or determined for that parsed data. For example, the security manager may direct that medical data is to be processed by a first cluster (e.g., using a first security protocol), while financial data is to be processed by a second cluster of that reconfigurable fabric (e.g., using a second security protocol). In some examples, the security manager may prevent and/or restrict results from one cluster from being shared with any other cluster, except as controlled by the security manager, thereby achieving variations in cluster-level security throughout the reconfigurable fabric.

The security manager 104, for example, may receive a plurality of data streams (e.g., first-fourth data streams) and control the plurality of processing elements 110 (e.g., first-fourth processing elements PE0-PE3) to encrypt the plurality of data streams, respectively. If a processing time required by one or more of the plurality of processing elements 110 in a first of the plurality of clusters 108 to encrypt one or more of the data streams is longer than a threshold time, remaining ones of the plurality of processing elements 110 in the first of the plurality of clusters 108 may be reconfigured to processes a portion of the one or more data streams. For example, if a processing time required by the first of the plurality of processing elements 110 in the first of the plurality of clusters 108 to encrypt the first of the data streams is longer than a threshold time, one or more of second-fourth of the plurality of processing elements 110 in the first of the plurality of clusters 108 may be reconfigured by the security manager to processes a portion of the first data stream previously received, and/or any or all of the remaining data streams as they are received. The number of the plurality of data streams, the number of the plurality of processing elements 110, and the number of the plurality of clusters 108 are not limited to any of the numbers described herein. For example, the number of data streams, the number of the plurality of processing elements 110, and the number the plurality of clusters 108 may be any of 2, 4, 8, 16, 32, 64, 128, 256, 512, 1024, etc., or any different number or combination thereof.

If a processing time expected by one or more of the plurality of processing elements 110 in any of the plurality of clusters 108 to process (e.g., encrypt) one or more of the plurality of data streams is longer than a threshold time, the one or more data streams may be encrypted by one or more others of the plurality of processing elements 110 in another one of the plurality of clusters 108. The threshold time may be an absolute threshold time in some examples, and/or may be a relative time (e.g., an amount of time relative to an expected time using a different security protocol). Alternatively, one or more of the plurality of processing elements 110 in multiple other clusters of the plurality of clusters 108 may be used to process (e.g., encrypt) the one or more data streams (e.g., the one or more data streams may be encrypted by any or all of the plurality of processing elements 110 in any or all of the plurality of clusters 108). For example, if a processing time used and/or expected to be used by any of the plurality of processing elements 110 in a first of the plurality of clusters 108 to process (e.g., encrypt) one or more of the plurality of data streams is longer than a threshold time, the one or more data streams may be processed (e.g., encrypted) by any one(s) of the plurality of processing elements 110 in any of second-fourth clusters of the plurality of clusters 108.

Each of the plurality of processing elements 110 of a given one of the plurality of clusters 108 may communicate directly with another one of the plurality of processing elements 110 within that same one of the plurality of clusters 108. For example, each of the processing elements PE0-3 may directly communicate with one another. Similarly, processing elements PE4-7 may communicate directly, as may processing elements PE8-11 and PE12-15. Any of the plurality of processing elements 110 of different ones of the plurality of clusters 108 may communicate with one another via a switch 120 based on instructions in an instruction set loaded for a given processing element. For example, the processing element PE14 may transmit a signal to the switch 120 with an instruction that the signal should be routed to the processing element PE1. The switch may route the signal directly to the processing element PE1 or the switch may route the signal to another processing element in the same cluster as PE1 (e.g., processing elements PE0, PE2, or PE3), which then route the received signal to processing element PE1. By linking clusters of processing elements together in this manner, greater or fewer ones of the plurality of clusters 108 may be added simply by changing the instruction sets that are loaded for a set of processing elements.

Because the security manager 104 utilizes part of the FPGA 102, it may also be updated or rearranged such that the assignment of the regions including the plurality of clusters 108 may be dynamically changed. For example, if the plurality of processing elements 110 in each of the plurality of clusters 108 reach close to capacity, and large unused sections of the plurality of processing elements 110 in remaining clusters of the plurality of clusters 108 are available, the security manager 104 may change the size of the plurality of clusters 108 (e.g., the number of processing elements allocated to the cluster) so that some of the unused processing elements of the plurality of processing elements 110 are reassigned as target processing elements.

The security manager 104 may also specify a lowest common denominator security protocol (e.g., encryption technique) for specific network devices that may utilize the reconfigurable fabric 106. The security manager 104 may specify that certain data is to be processed using a higher security protocol (e.g., encryption technique) than the lowest common denominator encryption technique. For example, encryption techniques may be scored (e.g., associated as a higher encryption technique or a lower encryption technique) on the basis of processing time and/or processing resources to be utilized in a cluster of the plurality of clusters 108. The higher encryption technique may take a longer time to process than the lowest common denominator encryption technique, but it may offer higher security in some examples. A higher encryption technique may be selected by the security manager 104 for processing certain data (e.g., medical data, personally identifiable information, etc.). The security manager may direct certain clusters to process the data according to the selected higher encryption technique. Even though one cluster of the plurality of clusters 108 may implement a security protocol that may differ from the selected encryption technique, the security manager 104 may direct the cluster to process that data according to the selected encryption technique. By directing the cluster(s) to process the data according to the selected encryption technique, the processing time for the data may be reduced.

Selection of which one(s) of the plurality of processing elements 110 in which one(s) of the plurality of clusters 108 used to process any or all of the data streams may be preprogrammed in the security manager 104 based on the type of the data stream to be encrypted, based on the type of security protocol used to process the data, other types of characteristics of the plurality of clusters 108 or the plurality of processing elements 110, or any combination thereof.

Figure 2:
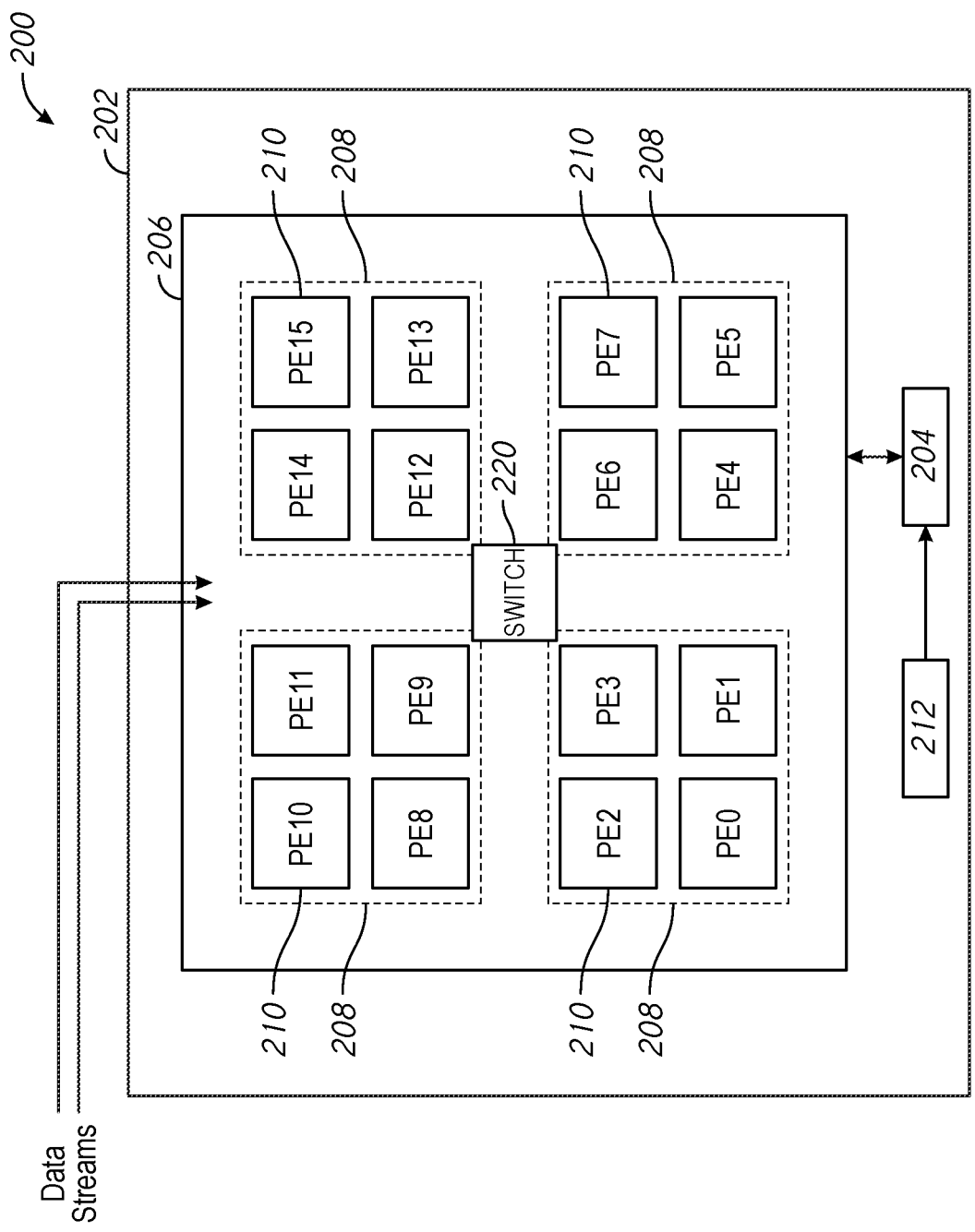
FIG. 2 is a block diagram showing a computer system, according to examples described herein.

FIG. 2 is a block diagram showing a computer system, according to examples described herein. For example, a computer system 200 may include an FPGA 202. The FPGA 202 may include and a security manager 204, a reconfigurable fabric 206, and a user selection device 212. The reconfigurable fabric 206 may further include a plurality of clusters 208, each of the clusters 208 having a set of processing elements 210. The reconfigurable fabric 206 may further include a switch 220.

The user selection device 212 may provide a request by a user to the security manager 204. The security manager 104 may determine to process certain data automatically based on the request received from the user selection device 212, based on the respective type of the plurality of data streams, or based on other characteristics of any of the plurality of processing elements 210 in any of the plurality of clusters 108. The request provided by the user via the user selection device 212 may be used by the security manager 204 to process certain data according to a certain security protocol. For example, the security manager 204 may receive, based on input by a user, a web request with standard SSL security from the user selection device 212. The user may specify that the web request be processed, for example, according to RS2 or some other security protocol. The security manager 204 may direct the request to a certain cluster of the plurality of clusters 208 of the reconfigurable fabric 206. The reconfigurable fabric 206 may process, via the plurality of clusters 208, data according to the security protocol requested by the user, and/or process the data according to another security protocol not requested by the user. The security protocol not requested by the user which may be used to process the data may be selected by the security manager 204 based on the type of data associated with the request provided by the user selection device 212 in some examples.

The security manager 204 may exclude external control of the plurality of clusters 208, unless the external data or external request is encoded with a certain security key. The security manager 204 may monitor the plurality of clusters 208 to ensure that the data that is being processed on some clusters of plurality of clusters 208 includes the security key. In various embodiments, the reconfigurable fabric 206 of FIG. 2 may be used to implement the reconfigurable fabric 106 of FIG. 1.

Figure 3:
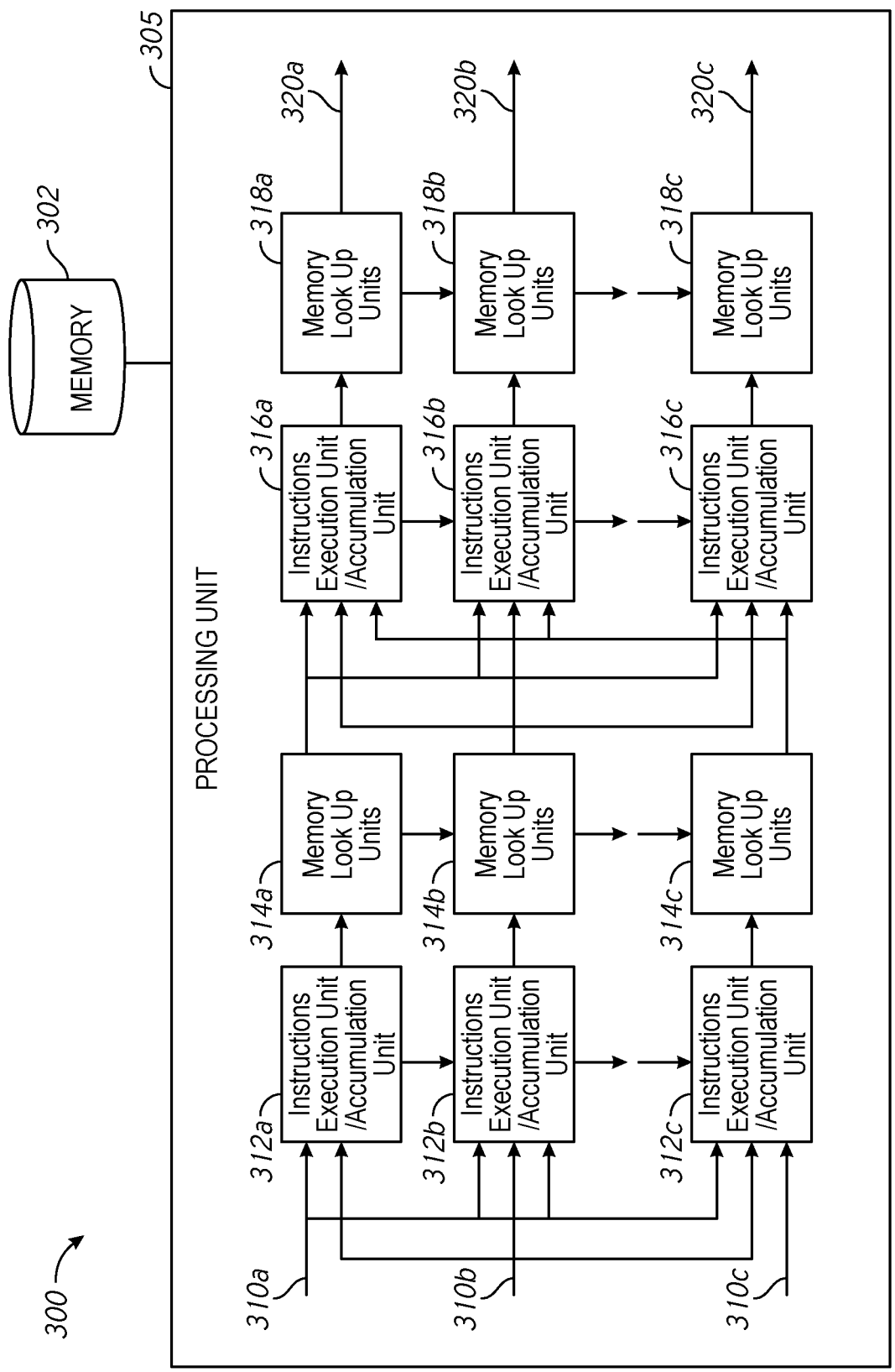
FIG. 3 is a block diagram of a computing system according to examples described herein.

FIG. 3 is a block diagram of a computing system 300 according to examples described herein. The computing system 300 may include a processing element 305 and a memory 302. The processing element 305 may receive input data 310a-c. In some examples, the input data 310a-c may be input data, such as a data stream received from the memory 302. For example, data stored in the memory 302 may be output data generated by one or more processing units implementing another processing stage. The processing element 305 may include instructions execution units/accumulation units 312a-c, 316a-c and memory lookup units 314a-c, 318a-c that, when processed by instructions stored in the processing element 305 or received from the memory 302, may generate output data 320a-c. In some examples, the output data 320a-c may be utilized as input data for another processing stage or as output data to be transmitted via an antenna.

The instructions used to process the data, for example, may be representative of an encryption type of data to be encrypted by the processing element 305. The input-output relationship of an instructions execution unit/accumulation unit 312, 316 may be based on the encryption type of the data to be encrypted by the processing element 305. The input data 310a-c may be representative of data to be encrypted by the processing element 305. The output data 320a-c may be representative of encrypted data. The operations within one or more processing elements 305 may be performed by using a computer-readable medium at an electronic device executing respective control instructions according to the data encryption type of the processing element 305.

In implementing one or more processing elements 305, a computer-readable medium at an electronic device may execute respective control instructions to perform operations within a processing element 305. For example, the control instructions provide instructions to the processing element 305, that when executed by the computing device, cause the processing element 305 to configure the instructions execution units/accumulation units 312a-c, along with the instructions execution units/accumulation units 316a-c, to process input data 310a-c to provide processing results used to generate the output data 320a-c.

The instructions execution units/accumulation units 312a-c, 316a-c perform operations on the input data 310a-c to generate an instructions result that is accumulated by the accumulation units of the instructions execution units/accumulation units 312a-c, 316a-c. For example, the instructions execution units/accumulation units 312a-c may perform instructions operation(s) such that the input data is processed to generate intermediate data that is an intermediate version of the input data and that is stored in the instructions execution units/accumulation units 312a-c. The instructions execution units/accumulation units 316a-c may perform additional instructions operation(s) on the intermediate data provided by the instructions execution units/accumulation units 312a-c such that the intermediate data is processed by the instructions execution units/accumulation units 316a-c to generate an output version of the intermediate data that is stored in the instructions execution units/accumulation units 316a-c. The output data may then be output by the instructions execution units/accumulation units 316a-c.

The memory look-up units 314a-c, 318a-c may retrieve instructions operations stored in memory 302. For example, the memory look-up units 314a-c, 318a-c may retrieve a table look-up that retrieves a specific instructions operation(s). The output of the instructions execution units/accumulation units 312a-c, 316a-c may be provided to the memory look-up units 314a-c, 318a-c that may be utilized to execute instructions operations on the data provided by the instructions execution units/accumulation units 312a-c, 316a-c. The instructions operations performed on the data provided to the instructions execution units/accumulation units 312a-c, 316a-c may be stored within the instructions execution units/accumulation units 312a-c, 316a-c or within the memory look-up units 314a-c, 318a-c. The memory look-up units 314a-c, 318a-c may be integrated within the instructions execution units/accumulation units 312a-c, 316a-c, or may be provided separate (e.g., independent) from the instructions execution units/accumulation units 312a-c, 316a-c. The memory look-up units 314a-c provided separate from the instructions execution units/accumulation units 312a-c may receive the input data from the instructions execution units/accumulation units 312a-c, and process the input data according to instructions operations received from the memory 302 to generate intermediate data. The memory look-up units 318a-c provided separate from the instructions execution units/accumulation units 316a-c may receive the intermediate data from the instructions execution units/accumulation units 316a-c, and process the intermediate data according to instructions operations received from the memory 302 to generate output data.

Using any of the circuitry arrangements described herein, the output data 320a-c may be generated from the input data 310a-c. Each of the instructions execution units/accumulation units 312a-c, 316a-c may include various execution circuits of different types for processing the input data 210a-c having a security level of one or more security levels.

In various embodiments, the processing element 305 receiving the input data 210a-c of FIG. 3 may be used to implement the processing elements 110 receiving the data streams of FIG. 1, or the processing elements 210 receiving the data streams of FIG. 2.

Figure 4:
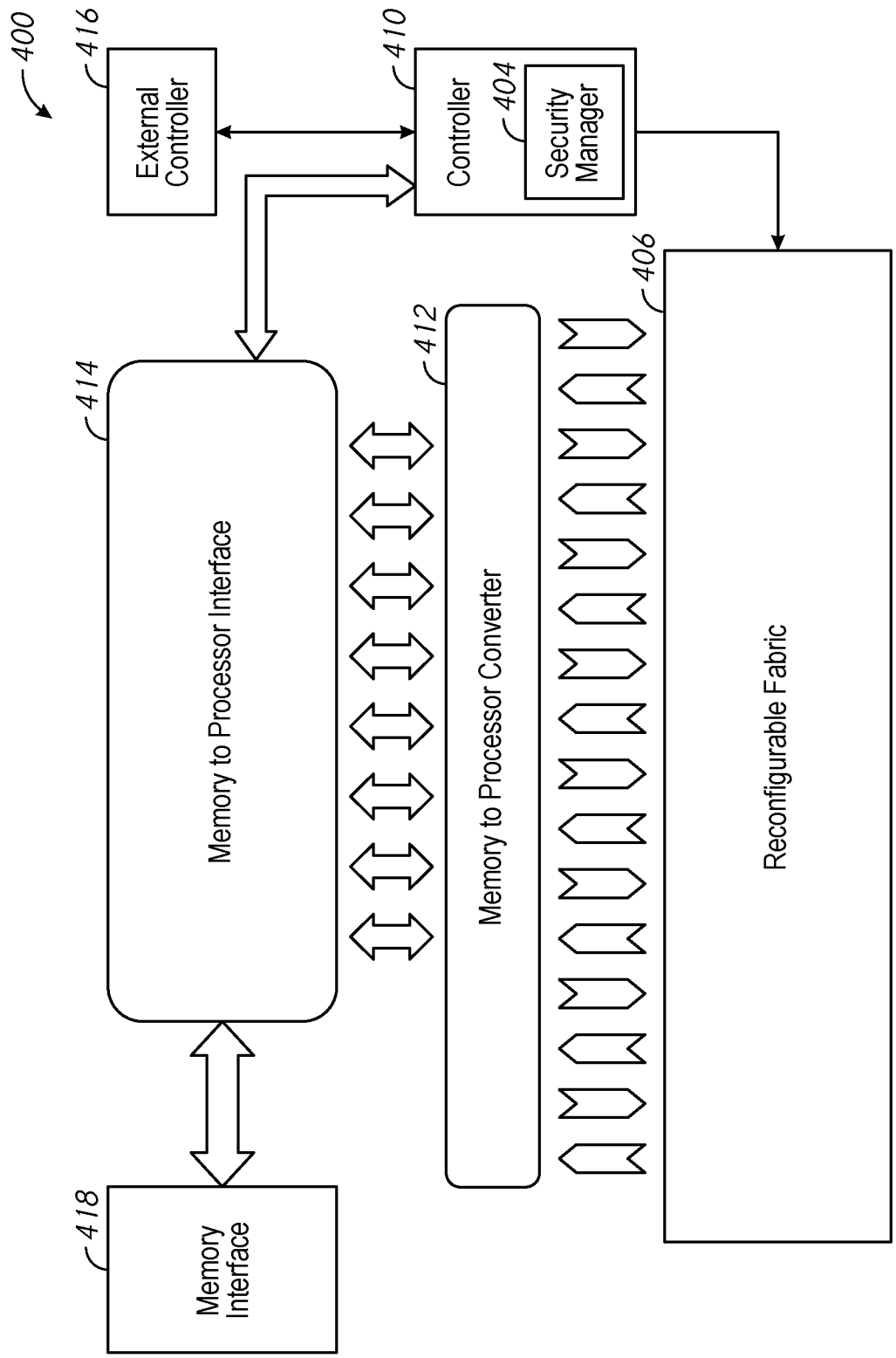
FIG. 4 is a block diagram showing a schematic illustration of an FPGA board of a computer system, according to examples described herein.

FIG. 4 is a block diagram showing a schematic illustration of an FPGA board of a computer system, according to examples described herein. For example, an FPGA board 400 includes a security manager 404 in a controller 410. The FPGA board 400 may further include a reconfigurable fabric 406, a memory to processor converter 412, a memory to processor interface 414, an external controller 416, and a memory interface 418.

The FPGA board 400 may include various components for providing data between a memory and the reconfigurable fabric 406. The data to be encrypted by the reconfigurable fabric 406 may be provided from a source (e.g., memory) that is external to the FPGA board 400. The FPGA board 400 may include the reconfigurable fabric 406 for encrypting data automatically, dynamically, manually based on user input, or any combination thereof. The reconfigurable fabric 406 may provide numerous possible combinations of circuitry for providing data to one or multiple portions of the circuitry for encryption according to a variety of speeds as required according to the type of data to be encrypted. For example, data requiring a higher level of encryption may be encrypted by circuits within the reconfigurable fabric 406 capable of operating based on algorithms associated with the higher level of encryption, and/or data requiring a different level (e.g., either a lower or higher level of encryption) of encryption may be encrypted by circuits within the reconfigurable fabric 406 capable of operating based on algorithms associated with the lower level of encryption (e.g., or by circuits within the reconfigurable fabric 406 capable of operating based on algorithms associated with either the lower level of encryption or the higher level of encryption). Circuits within the reconfigurable fabric 406 associated with one or more algorithms for a certain level of encryption may be reprogrammed with any other one or more algorithms for another level of encryption. In various embodiments, each of the circuit(s) within the reconfigurable fabric 406 associated with the algorithm(s) for various level(s) of encryption may be implemented by any of the plurality of processing elements 110 of FIG. 1 or by any of the plurality of processing elements 210 of FIG. 2.

The controller 410 may interact with the memory to processor interface 414 (e.g., a PCI/e to AXI memory mapped converter (A)) to receive data from memory via the memory interface 118 (e.g., PCI/core). The controller 410 may receive data from memory, via the memory to processor interface 414 and via the memory interface 118, based on a control signal(s) provided by the external controller 416. The controller 410 may provide feedback to the external controller 416 after the data received from memory via the memory to processor interface 414, and via the memory interface 118 external controller, has been encrypted.

The data, responsive to the request from the external controller 116, may be provided from the memory, via the memory interface 118, to the processor interface 414. The data provided from the memory to the processor interface 414 may then be provided to the memory to processor converter 412. The memory to processor converter 412 may covert the data to a format suitable for encryption and provide the converted data to the reconfigurable fabric 406. The reconfigurable fabric 406 may then encrypt the data.

The security manager 404 may maintain access to the reconfigurable fabric 406 from any outside entity, parsing data to be processed based on a level of security requested or determined for that parsed data. For example, the security manager 404 may direct that medical data is to be processed by the reconfigurable fabric 406 differently from financial data. The medical data may then be processed by the reconfigurable fabric 406 differently from financial data processed by the reconfigurable fabric 406. The security manager 404 may direct that results of one type of data processed by one portion of the reconfigurable fabric 406 are not to be shared with another portion of the reconfigurable fabric 406, except as controlled by the security manager 404. Prohibiting the results of one type of data processed by one portion of the reconfigurable fabric 406 from being shared with another portion of the reconfigurable fabric 406 may achieve variations in security throughout the reconfigurable fabric 406.

Unused processing elements of a plurality of processing elements in the reconfigurable fabric 406 may be reassigned (e.g., by the security manager 404) as target processing elements. By reassigning some of the unused processing elements of the plurality of processing elements as target processing elements, the capacity of the target processing elements of the plurality of processing elements may be made larger. Also, when new versions of OS software are periodically developed, the security manager 404 may be updated with the new versions. In various embodiments, the security manager 404 and the reconfigurable fabric 406 of FIG. 4 may be used to implement, respectively, the security manager 104 and the reconfigurable fabric 106 of FIG. 1. In various embodiments, the security manager 404 and the reconfigurable fabric 406 of FIG. 4 may be used to implement, respectively, the security manager 204 and the reconfigurable fabric 206 of FIG. 2. The components, and arrangement thereof, of the circuits and/or boards that may be used in combination with the reconfigurable fabric 106 of FIG. 1 or the reconfigurable fabric 206 are not limited to the board of FIG. 4, and various other circuits and/or boards may be used.

Figure 5:
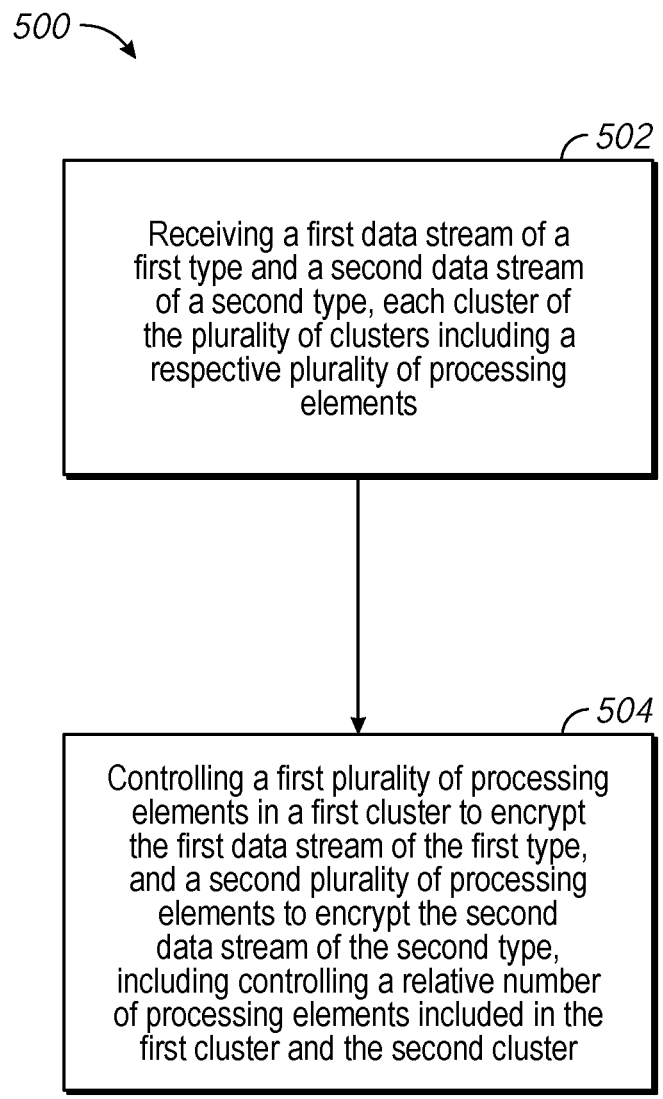
FIG. 5 is a method for operating a computer system, according to examples described herein.

FIG. 5 is a method for operating a computer system, according to examples described herein. For example, a method 500 includes a step 502 for receiving, by a plurality of clusters in a reconfigurable fabric included in an FPGA board, a first data stream of a first type and a second data stream of a second type, each cluster of the plurality of clusters including respective processing elements of a plurality of processing elements. The method 500 may include a step 504 for controlling, by a security manager coupled to the plurality of clusters in the reconfigurable fabric included in the FPGA board, at least one first processing element of the plurality of processing elements in a first cluster to encrypt data of a first type of the first data stream, and at least one second processing element of the plurality of processing elements to encrypt data of a second type of the second data stream.

Any data stream, for example, to be encrypted by a processing element in a cluster, may be routed to, and encrypted by, any other processing element(s) in any other cluster(s). Alternatively, for example, when a portion of a data stream has been encrypted by a processing element in a cluster, a remaining portion of the data stream may be encrypted by any other processing element in any other cluster after encryption of the data stream has already commenced. In a case when the encryption of the data stream by the processing element in the cluster has already commenced, another processing element in the same cluster or another one of the clusters may encrypt the data stream if the another processing element is configured to encrypt the data stream according to the algorithm associated with the data stream. In a case when the encryption of the data stream by the processing element in the cluster has already commenced, another processing element in the same cluster or another one of the clusters may be reconfigured to encrypt the remaining portion of the data stream, if the another processing element was not previously configured to encrypt the data stream according to the algorithm associated with the data stream. After the reconfiguration is achieved, the another processing element in the same cluster or another one of the clusters may encrypt the remaining portion of the data stream.

The controlling of the at least one first processing element and the at least one second processing element may include loading a first instruction set including a first encryption algorithm to the at least one first processing element. The encryption algorithm may correspond to at least one of a turbocoding algorithm, a higher encryption algorithm, or any combination thereof.

The controlling the at least one first processing element and the at least one second processing element may further include loading a second instruction set including a second encryption algorithm to the at least one second processing element. The second encryption algorithm may correspond to a lowest common denominator algorithm.

The method 500 may further include determining that the data of the first data stream is to be processed according to the first encryption algorithm based on a portion of the data of the first data stream indicative of the first encryption algorithm. The portion of the data of the first data stream may correspond to one of a flag, header, a data type, or any combination thereof. The number of the data streams, the number of the processing elements, and the number the clusters are not limited to any of the numbers described herein. For example, the number of the data streams, the number of the processing elements, and the number the clusters may be any of 2, 4, 8, 16, 32, 64, 128, 256, 512, 1024, etc., or any combination thereof. In various embodiments, the method 500 of FIG. 5 may be implemented by using any of the computing systems and or FPGA board disclosed herein, including: computer system 100 in FIG. 1, computer system 200 in FIG. 2, computer system 300 in FIG. 3, FPGA board 400, or any combination of the systems and/or FPGA board depicted in any of FIGS. 1-4 described herein.

Figure 6:
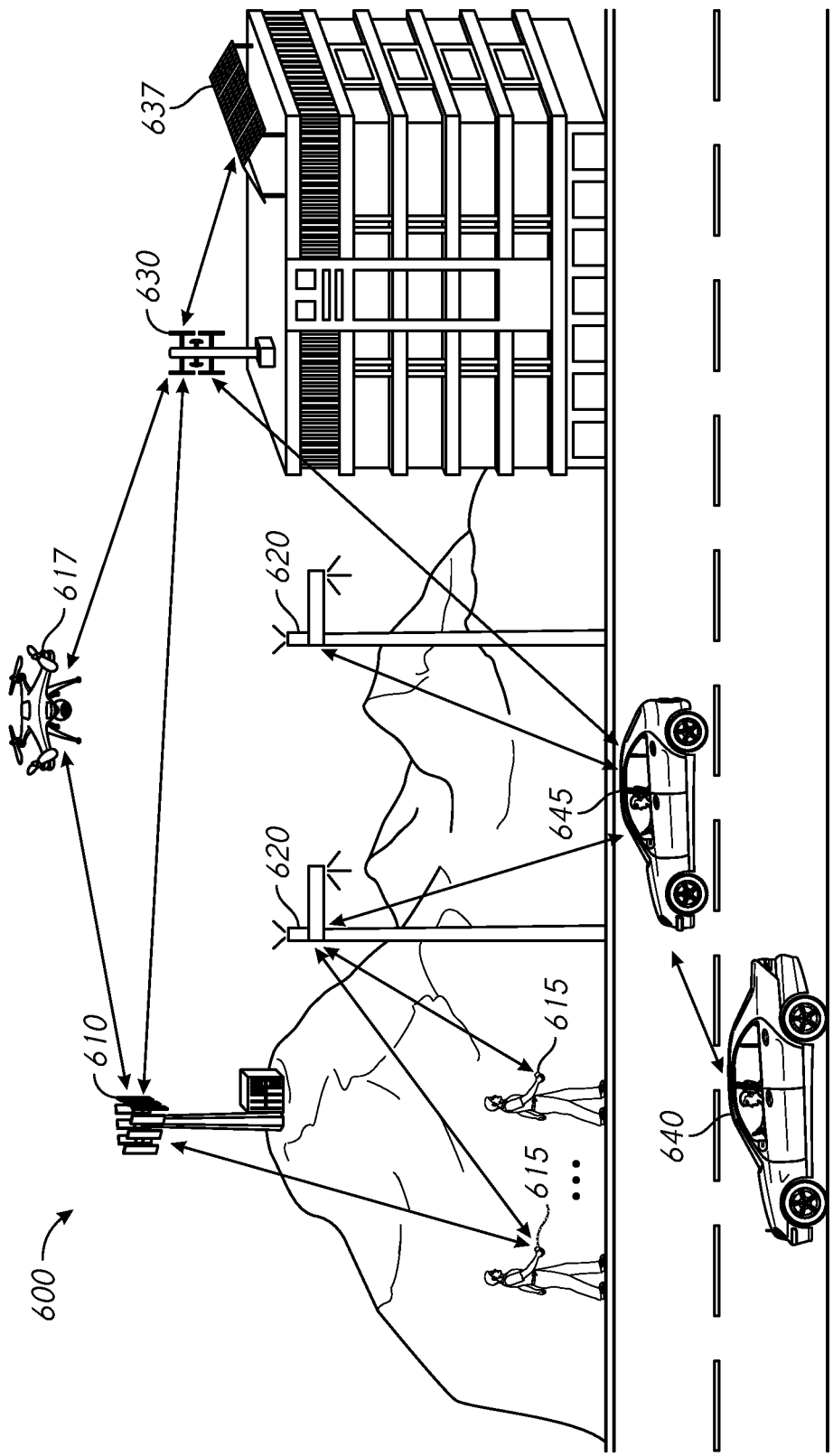
FIG. 6 is a block diagram showing a computer system, according to examples described herein.

FIG. 6 illustrates an example of a wireless communications system 600 according to examples described herein. The wireless communications system 600 includes a base station 610, a mobile device 615, a drone 617, a small cell 630, and vehicles 640, 645. The base station 610 and small cell 630 may be connected to a network that provides access to the Internet and traditional communication links. The system 600 may facilitate a wide-range of wireless communications connections in a 5G wireless system that may include various frequency bands, including but not limited to: a sub-6 GHz band (e.g., 600 MHz communication frequency), mid-range communication bands (e.g., 2.4 GHz), and mmWave bands (e.g., 24 GHz).

Additionally or alternatively, the wireless communications connections may support various modulation schemes, including but not limited to: filter bank multi-carrier (FBMC), generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 600 may depict aspects of a radio access network (RAN), and system 600 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 610, communication devices 620, and small cells 630 may be coupled with the core network or with one another, or both, via wired or wireless backhaul links (e.g., S1 interface, X2 interface, etc.).

The system 600 may provide communication links connected to devices or "things," such as sensor devices, e.g., solar cells 637, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 50, 100, or 200 KHz, for example.

Additionally or alternatively, the IoT may include devices or things operating at different frequencies than traditional cellular technology to facilitate use of the wireless spectrum. For example, an IoT framework may allow multiple devices in system 600 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 637, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment. Such data may be used to indicate an environmental characteristic of the sensor.

In such a 5G framework, devices may perform functionalities performed by base stations in other mobile networks (e.g., UMTS or LTE), such as forming a connection or managing mobility operations between nodes (e.g., handoff or reselection). For example, mobile device 615 may receive sensor data from the user utilizing the mobile device 615, such as blood pressure data, and may transmit that sensor data on a narrowband IoT frequency band to base station 610. In such an example, some parameters for the determination by the mobile device 615 may include availability of licensed spectrum, availability of unlicensed spectrum, and/or time-sensitive nature of sensor data. Continuing in the example, mobile device 615 may transmit the blood pressure data because a narrowband IoT band is available and may transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 615 may form device-to-device (D2D) connections with other mobile devices or other elements of the system 600. For example, the mobile device 615 may form RFID, WiFi, MultiFire, Bluetooth, or Zigbee connections with other devices, including communication device 620 or vehicle 645. In some examples, D2D connections may be made using licensed spectrum bands, and such connections may be managed by a cellular network or service provider. Accordingly, while the above example was described in the context of narrowband IoT, it may be appreciated that other device-to-device connections may be utilized by mobile device 615 to provide information (e.g., sensor data) collected on different frequency bands than a frequency band determined by mobile device 615 for transmission of that information.

Moreover, some communication devices may facilitate ad-hoc networks, for example, a network being formed with communication devices 620 attached to stationary objects) and the vehicles 640, 645, without a traditional connection to a base station 610 and/or a core network necessarily being formed. Other stationary objects may be used to support communication devices 620, such as, but not limited to, trees, plants, posts, buildings, blimps, dirigibles, balloons, street signs, mailboxes, or combinations thereof. In such a system 600, communication devices 620 and small cell 630 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 615 communicating with base station 610 on a cellular communication band.

The communication devices 620 may form wireless networks, operating in either a hierarchal or ad-hoc network fashion, depending, in part, on the connection to another element of the system 600. For example, the communication devices 620 may utilize a 600 MHz communication frequency to form a connection with the mobile device 615 in an unlicensed spectrum, while utilizing a licensed spectrum communication frequency to form another connection with the vehicle 645. Communication devices 620 may communicate with vehicle 645 on a licensed spectrum to provide direct access for time-sensitive data, for example, data for an autonomous driving capability of the vehicle 645 on a 5.9 GHz band of Dedicated Short Range Communications (DSRC).

Vehicles 640 and 645 may form an ad-hoc network at a different frequency band than the connection between the communication device 620 and the vehicle 645. For example, for a high bandwidth connection to provide time-sensitive data between vehicles 640, 645, a 24 GHz mmWave band may be utilized for transmissions of data between vehicles 640, 645. For example, vehicles 640, 645 may share real-time directional and navigation data with each other over the connection while the vehicles 640, 645 pass each other across a narrow intersection line. Each vehicle 640, 645 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 620 and the vehicle 645, for example, for processing of image data received at both vehicle 645 and vehicle 640, as transmitted by the vehicle 640 to vehicle 645 over the 24 GHz mmWave band. While shown as automobiles in FIG. 6, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it may be appreciated that connections may be formed in the system 600 in other mmWave bands or other frequency bands, such as 28 GHz, 37 GHz, 38 GHz, 39 GHz, which may be licensed or unlicensed bands. In some cases, vehicles 640, 645 may share the frequency band on which they are communicating with other vehicles in a different network. For example, a fleet of vehicles may pass vehicle 640 and, temporarily, share the 24 GHz mmWave band to form connections among that fleet, in addition to the 24 GHz mmWave connection between vehicles 640, 645. As another example, communication device 620 may substantially simultaneously maintain a 600 MHz connection with the mobile device 615 operated by a user (e.g., a pedestrian walking along the street) to provide information regarding a location of the user to the vehicle 645 over the 5.9 GHz band. In providing such information, communication device 620 may leverage antenna diversity schemes as part of a massive MIMO framework to facilitate time-sensitive, separate connections with both the mobile device 615 and the vehicle 645. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 610 and small cell 630 may wirelessly communicate with devices in the system 600 or other communication-capable devices in the system 600 having at the least a sensor wireless network, such as solar cells 637 that may operate on an active/sleep cycle, and/or one or more other sensor devices. The base station 610 may provide wireless communications coverage for devices that enter its coverages area, such as the mobile device 615 and the drone 617. The small cell 630 may provide wireless communications coverage for devices that enter its coverage area, such as near the building that the small cell 630 is mounted upon, such as vehicle 645 and drone 617.

Generally, the small cell 630 may be referred to as a small cell and provide coverage for a local geographic region, for example, coverage of 200 meters or less in some examples. This may be contrasted with a macrocell, which may provide coverage over a wide or large area on the order of several square miles or kilometers. In some examples, a small cell 630 may be deployed (e.g., mounted on a building) within some coverage areas of a base station 610 (e.g., a macrocell) where wireless communications traffic may be dense according to a traffic analysis of that coverage area. For example, a small cell 630 may be deployed on the building in FIG. 6 in the coverage area of the base station 610 if the base station 610 generally receives and/or transmits a higher amount of wireless communication transmissions than other coverage areas of that base station 610. A base station 610 may be deployed in a geographic area to provide wireless coverage for portions of that geographic area. As wireless communications traffic becomes denser, additional base stations 610 may be deployed in certain areas, which may alter the coverage area of an existing base station 610, or other support stations may be deployed, such as a small cell 630. Small cell 630 may be a femtocell, which may provide coverage for an area smaller than a small cell (e.g., 100 meters or less in some examples (e.g., one story of a building)).

While base station 610 and small cell 630 may provide communication coverage for a portion of the geographical area surrounding their respective areas, both may change aspects of their coverage to facilitate faster wireless connections for certain devices. For example, the small cell 630 may primarily provide coverage for devices surrounding or in the building upon which the small cell 630 is mounted. However, the small cell 630 may also detect that a device has entered is coverage area and adjust its coverage area to facilitate a faster connection to that device.

For example, a small cell 630 may support a massive MIMO connection with the drone 617, which may also be referred to as an unmanned aerial vehicle (UAV), and, when the mobile device 615 enters it coverage area, the small cell 630 adjusts some antennas to point directionally in a direction of the vehicle 645, rather than the drone 617, to facilitate a massive MIMO connection with the vehicle, in addition to the drone 617. In adjusting some of the antennas, the small cell 630 may not support as fast as a connection to the drone 617, as it had before the adjustment. However, the drone 617 may also request a connection with another device (e.g., base station 610) in its coverage area that may facilitate a similar connection as described with reference to the small cell 630, or a different (e.g., faster, more reliable) connection with the base station 610. Accordingly, the small cell 630 may enhance existing communication links in providing additional connections to devices that may utilize or demand such links. For example, the small cell 630 may include a massive MIMO system that directionally augments a link to vehicle 645, with antennas of the small cell directed to the vehicle 645 for a specific time period, rather than facilitating other connections (e.g., the small cell 630 connections to the base station 610, drone 617, or solar cells 637). In some examples, drone 617 may serve as a movable or aerial base station.

The wireless communications system 600 may include devices such as base station 610, communication device 620, and small cell 630 that may support several connections to devices in the system 600. Such devices may operate in a hierarchal mode or an ad-hoc mode with other devices in the network of system 600. While described in the context of a base station 610, communication device 620, and small cell 630, it may be appreciated that other devices that may support several connections with devices in the network may be included in system 600, including but not limited to: macrocells, femtocells, routers, satellites, and RFID detectors.

In various examples, the elements of wireless communication system 600, such as the drone 617 and the solar cells 637, may be implemented utilizing the systems, apparatuses, and methods described herein. For example, an electric device including the computing system 100, may be implemented using any of the elements of communication system 600. For example, each of the solar cells 637 and the drone 617 may be implemented as the electric device including the computing system 100 including the reconfigurable fabric 106. The drone 617, being implemented as the electronic device including the system 100, may receive data streams having a high security level. The data streams having the high security level received from the drone 617 might provide information regarding operation of the drone 617 including a location, movement characteristics, operational parameters, environmental conditions, operational levels, and/or a targeted destination. The data streams having the high security level received from the drone 617 may further, or alternatively, provide information regarding a surveillance target including a location, type, movement direction, identification, and/or visible description of the surveillance target. The data streams having the high security level received from the drone 617 may further, or alternatively, include various aerodynamic properties of the drone 617 traveling through the air space, such as detected wind direction and/or airspeed. The solar cells 637, being implemented as the electronic device including the system 100, may receive data streams having a low security level. The data streams having the low security level received from the solar cells 637 may provide a power level, operational parameters, operational metrics, historical operational characteristics, previous and current performance capabilities, and/or predicted performance capabilities.

Additionally or alternatively, while described in the examples above in the context of the drone 617 and the solar cells 637, the elements of communication system 600 may be implemented as part of any of the computing systems disclosed herein, including: computer system 100 in FIG. 1, computer system 200 in FIG. 2, computer system 300 in FIG. 3, FPGA board 400, or any combination of the systems and/or FPGA board depicted in any of FIGS. 1-4 described herein.

The drone 617 may receive data from the base station 610 and provide the received data to processing units (e.g., processing units 110, refer to FIG. 1) that are configured to operate for an active time period. The processing units may be configured to process the data received from the base station 610. The drone 617 may transmit an RF signal via an antenna to the base station 610 with the data streams that are processed by the processing units implementing various processing stages, as described herein. Accordingly, the drone 617 may utilize less die space on a silicon chip than conventional signal processing systems and techniques that may include additional hardware or specially-designed hardware, thereby allowing the drone 617 to be of smaller size compared to drones having such conventional signal processing systems and techniques.

In the example, the solar cells 637, being implemented as the electric device with the computing system 100, may receive data from the base station 610 and provide the received data to processing units (e.g., processing units 110, refer to FIG. 1). The processing units may be configured to operate for an active time period and process the received data streams over a sequence of configurations. For example, the processing units may implement the process the received data into encoded data of any of a variety of security levels according to the type of security level of the data. After further processing of encoded data, the solar cells 637 may transmit an RF signal to the small cell 630 that is configured to receive a MIMO signal.

Figure 7:
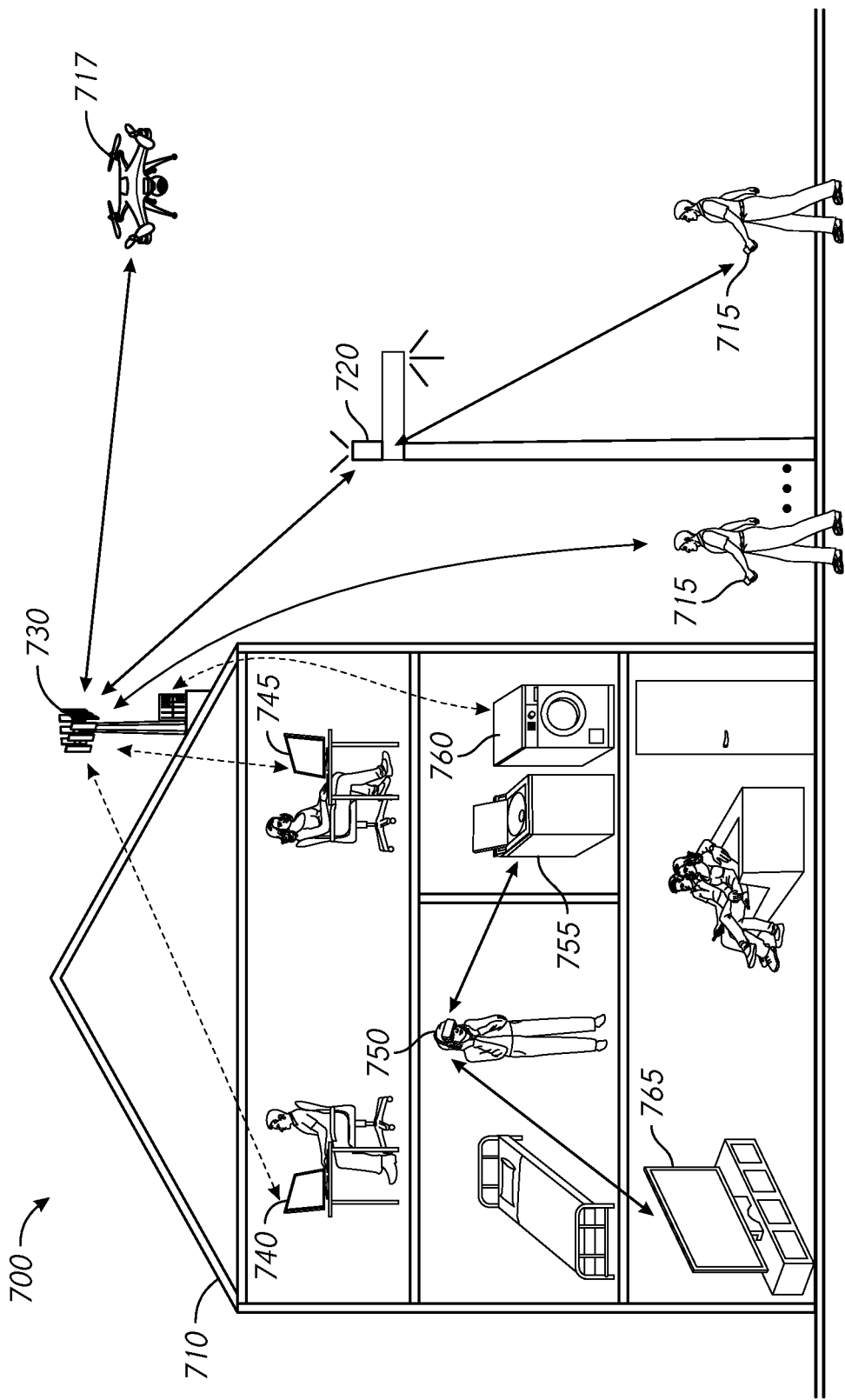
FIG. 7 is a block diagram showing a computer system, according to examples described herein.

FIG. 7 illustrates an example of a wireless communications system 700 according to examples described herein. The wireless communications system 700 may include a mobile device 715, a drone 717, a communication device 720, and a small cell 730. A building 710 also includes devices of the wireless communications system 700 that may be configured to communicate with other elements in the building 710 or the small cell 730. The building 710 includes networked workstations 740, 745, virtual reality device 750, IoT devices 755, 760, and networked entertainment device 765. In the depicted wireless communications system 700, IoT devices 755, 760 may be a washer and dryer, respectively, for residential use, being controlled by the virtual reality device 750. Accordingly, while the user of the virtual reality device 750 may be in different room of the building 710, the user may control an operation of the IoT device 755, such as configuring a washing machine setting. Virtual reality device 750 may also control the networked entertainment device 765. For example, virtual reality device 750 may broadcast a virtual game being played by a user of the virtual reality device 750 onto a display of the networked entertainment device 765.

The small cell 730 or any of the devices of building 710 may be connected to a network that provides access to the Internet and traditional communication links. Like the system 700, the wireless communications system 700 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 700. Wireless communications system 700 may operate and be configured to communicate analogously to system 600. Accordingly, similarly numbered elements of wireless communications system 700 and system 600 may be configured in an analogous way, such as communication device 720 to communication device 620, small cell 730 to small cell 630, etc.

Like the system 600, where elements of system 600 are configured to form independent hierarchal or ad-hoc networks, communication device 720 may form a hierarchal network with small cell 730 and mobile device 715, while an additional ad-hoc network may be formed among the small cell 730 network that includes drone 717 and some of the devices of the building 710, such as networked workstations 740, 745 and IoT devices 755, 760.

Devices in wireless communications system 700 may also form D2D connections with other mobile devices or other elements of the wireless communications system 700. For example, the virtual reality device 750 may form a narrowband IoT connections with other devices, including IoT device 755 and networked entertainment device 765. As described above, in some examples, D2D connections may be made using licensed spectrum bands, and such connections may be managed by a cellular network or service provider. Accordingly, while the above example was described in the context of a narrowband IoT, it may be appreciated that other device-to-device connections may be utilized by virtual reality device 750.

In various examples, the elements of wireless communications system 700, such as the mobile device 715, the drone 717, the communication device 720, the small cell 730, the networked workstations 740, 745, the virtual reality device 750, the IoT devices 755, 760, and the networked entertainment device 765, may be implemented as part of any of the computing system 100 in FIG. 1, computing system 200 in FIG. 2, computing system 300 in FIG. 3, FPGA board 400 in FIG. 4, or any combination of the systems or FPGA board, depicted in any of FIGS. 1-4 described herein.

For example, any of the mobile device 715, the drone 717, the communication device 720, the small cell 630, the networked workstations 740, 745, the virtual reality device 750, the IoT devices 755, 760, and the networked entertainment device 765 may be implemented as an electronic device including the system 100 to receive data having a low security level, a medium security level, or a high security level. The drone 717, being implemented as the electronic device including the system 100, may receive data having a high security level. The virtual reality device 750, being implemented as the electronic device including the system 100, may receive data having a medium security level. The IoT device 755, being implemented as the electronic device including the system 100, may receive data having a low security level. The components, and arrangement thereof, of the elements of FIG. 7 including the drone, the virtual reality device, and the IoT device that may be implemented as the electronic device including the system 100 of FIG. 1 or the system 200 of FIG. 2, are not limited to the types of security levels, and various other security levels may be used with any of the elements of FIG. 7. The virtual reality device 750, receiving a narrowband RF signal, may display a visual representation of a drying status, such as a percentage bar, on an icon on a display of the virtual reality device 750, thereby updating the user of the virtual reality device 750 as to a status of the user's clothes in the IoT device 755.

Each of the drone 717, the IoT device 755, and the virtual reality device 750, may provide data between one another, and process the received data according to the security level of the respective data. For example, the drone 717 may provide data to the virtual reality device 750. The virtual reality device 750 may include processing elements configured to process data having a medium security level, and may reconfigure the processing elements and process the data having the high security level received from the drone 717 according to the high security level. For example, the data received by the drone 717 to be processed according to the high security level, are provided to the virtual reality device 750 and processed at the high security level by the virtual reality device 750.

Additionally or alternatively, while described in the examples above in the context of the IoT device 760, the elements of communication system 700 may be implemented as part of any of the computing systems disclosed herein, including: computing system 100 in FIG. 1, computing system 200 in FIG. 2, computing system 300 in FIG. 3, FPGA board 400 in FIG. 4, or any combination of the systems and/or FPGA board depicted in any of FIGS. 1-4 described herein.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as 3GPP, Third Generation Partnership Project 2 (3GPP2) and IEEE. These wireless standards include Ultra Mobile Broadband (UMB), Universal Mobile Telecommunications System (UMTS), LTE, LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a DSP, an application-specific integrated circuit (ASIC), an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise RAM, ROM, electrically erasable programmable read only memory (EEPROM), or optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Although the embodiments of the present invention have been described with reference to the disclosed embodiments, persons skilled in the art will recognize that changes may be made in form and detail without departing from the embodiments of the invention.

What is claimed is:

1. An apparatus comprising:
a reconfigurable hardware platform comprising a plurality of processors, wherein the plurality of processors include respective pluralities of instructions execution units/accumulation units and memory lookup units; and
a security manager configured to assign some of the plurality of processors to a first cluster and others of the plurality of processors to a second cluster, wherein the first cluster is configured to implement a first security protocol including a first type of encryption and the second cluster is configured to implement a second security protocol including a second type of encryption, the security manager further configured to examine an incoming data stream to determine a type of data included in the data stream, wherein the security manager is configured to assign the data stream to the first cluster in response to a determination that the data has a first type and to assign the data stream to the second cluster in response to a determination that the data has a second type, wherein the security manager is further configured to reassign processors from the first cluster to the second cluster, or vice versa, and wherein the security manager is configured to selectively restrict results outputted by the first cluster from being shared with the second cluster.

2. The apparatus of claim 1, wherein the security manager is configured to determine an amount of time used to process the data stream with the assigned one of the first or the second cluster, and further configured to change a number of processors in the assigned one of the first or the second cluster by reassigning processors from the other of the first or the second cluster.

3. The apparatus of claim 1, wherein the security manager is configured to determine a load on the first cluster and a load on the second cluster and reassign processors from the second cluster to the first cluster when the load on the first security protocol is greater than a load on the second security protocol.

4. The apparatus of claim 1, wherein the security manager is configured to reassign processors by loading selected processors with instructions associated with the first security protocol or the second security protocol.

5. The apparatus of claim 1, wherein the security manager is configured to update the first cluster but not the second cluster.

6. A method comprising:
receiving, with a plurality of processors of a reconfigurable hardware platform, a data stream;
assigning, with a security manager, some of the plurality of processors to a first cluster and others of the plurality of processors to a second cluster;
configuring the first cluster to implement a first security protocol including a first type of encryption;
configuring the second cluster to implement a second security protocol including a second type of encryption;
determining a type of the data included in the data stream;
assigning the data stream to the first cluster in response to a determination that the data has a first type, wherein the security manager selectively restricts results outputted by the first cluster from being shared with at least one other cluster;
assigning the data stream to the second cluster in response to a determination that the data has as second type; and
reassigning some of the plurality of processors from the first cluster to the second cluster, or vice versa.

7. The method of claim 6, further comprising:
determining an amount of time used to process the data stream with the assigned one of the first or the second cluster; and
changing a number of processors in the assigned one of the first or the second cluster by reassigning processors from the other of the first or the second cluster.

8. The method of claim 6, further comprising:
determining a load on the first cluster and a load on the second cluster; and
reassigning processors from the second cluster to the first cluster when the load on the first cluster is greater than a load on the second cluster.

9. The method of claim 6, further comprising updating the first cluster but not the second cluster.

10. The method of claim 6, wherein reassigning the some of the plurality of processors associated with one of the first security protocol or the second security protocol comprises loading instructions associated with the other of the first security protocol or the second security protocol different than the associated one to the some of the plurality of processors.

11. An apparatus comprising:
a reconfigurable hardware platform configured to receive a plurality of data streams, the reconfigurable hardware platform comprising a plurality of processors each assigned to one of a plurality of processor clusters; and
a security manager configured to assign a data stream of the plurality of data streams to a first one of the plurality of processing clusters configured to implement a first security protocol including a first type of encryption in response to a determination that data of the data stream has a first type of data and to assign the data stream to a second one of the plurality of processing clusters configured to implement a second security protocol including a second type of encryption in response to a determination that data of the data stream has a second type of data, wherein each of the plurality of processing clusters is configured to implement a respective security protocol, wherein the security manager is configured to dynamically reassign a number of the plurality of processors from at least one processor cluster of the plurality of processor clusters to at least another processor cluster of the plurality of processor clusters based on processing the plurality of data streams, and wherein the security manager is configured to selectively restrict results outputted by one of the plurality of clusters from being shared with others of the plurality of clusters.

12. The apparatus of claim 11, wherein the security manager is further configured to assign a first data stream of the plurality of data streams to a first cluster of the plurality of processing clusters, and reassign some of the plurality of processors not in the first cluster to process at least a portion of the first data stream.

13. The apparatus of claim 11, wherein the plurality of data streams are accessed, rearranged, and managed on a single device.

14. The apparatus of claim 11, wherein the security manager is configured to update some, but not all of the plurality of processor clusters.

15. The apparatus of claim 11, wherein the security manager is configured to dynamically reassign unused ones of the plurality of processors to ones of the plurality of processing clusters which are close to capacity.

16. The apparatus of claim 1, wherein the security manager is configured to determine an amount of time used to process the data stream with the assigned one of the first or the second cluster.

17. The apparatus of claim 1, wherein the reconfigurable hardware platform further comprises a switch configured to transmit a signal from a first processor of the plurality of processors to a second processor of the plurality of processors based on instructions in an instruction set.

18. The apparatus of claim 1, wherein the respective pluralities of instructions execution units/accumulation units and memory lookup units are configured to execute instructions representative of the first type of encryption or the second type of encryption.

19. The apparatus of claim 1, wherein the instructions execution units/accumulation units are configured to process input data to generate intermediate data and accumulate the intermediate data, and wherein the memory lookup units are configured to retrieve instructions operations from a memory and process the intermediate data to generate output data.

* * * * *